(12) United States Patent
Masuda et al.

(10) Patent No.: US 8,673,412 B2
(45) Date of Patent: Mar. 18, 2014

(54) ADHESIVE COMPOSITION FOR POLARIZING PLATES, POLARIZING PLATE WITH ADHESIVE USING SAME, AND LIQUID CRYSTAL DISPLAY DEVICE USING SAME

(75) Inventors: Shuhei Masuda, Tochigi (JP); Hiroto Nakano, Tochigi (JP); Yasuhisa Hagiwara, Tochigi (JP); Naomi Furue, Tochigi (JP)

(73) Assignee: Nippon Carbide Industries Co., Inc., Tokyo (JP)

( * ) Notice: Subject to any disclaimer, the term of this patent is extended or adjusted under 35 U.S.C. 154(b) by 0 days.

(21) Appl. No.: 13/643,220

(22) PCT Filed: Apr. 25, 2011

(86) PCT No.: PCT/JP2011/060058
§ 371 (c)(1),
(2), (4) Date: Oct. 24, 2012

(87) PCT Pub. No.: WO2011/136173
PCT Pub. Date: Nov. 3, 2011

(65) Prior Publication Data
US 2013/0040075 A1    Feb. 14, 2013

(30) Foreign Application Priority Data
Apr. 26, 2010  (JP) .................................. 2010-101524

(51) Int. Cl.
*C09J 133/08* (2006.01)
*G02C 7/12* (2006.01)

(52) U.S. Cl.
USPC .................................... 428/1.54; 428/355 AC

(58) Field of Classification Search
USPC ....... 428/1.3, 1.5, 355 AC, 1.54; 349/96.122; 525/194; 524/522
See application file for complete search history.

(56) References Cited

U.S. PATENT DOCUMENTS

2011/0236605 A1 * 9/2011 Hattori et al. ................ 428/1.55

FOREIGN PATENT DOCUMENTS

| JP | 09-113724 | 5/1997 |
|---|---|---|
| JP | 09-137143 | 5/1997 |
| JP | 10-279907 | 10/1998 |
| JP | 2005-043795 | 2/2005 |
| JP | 2005-298724 | 10/2005 |
| JP | 2006-133606 | 5/2006 |
| JP | 2008-156513 | 7/2008 |
| JP | 2008-280375 | 11/2008 |
| JP | 2009-221324 | 10/2009 |

OTHER PUBLICATIONS

Abstract of WO/2010/024103 of PCT/JP2009/063966, Hattori et al., Mar. 4, 2010.*
International Search Report dated Jun. 28, 2011 issued in PCT/JP2011/060058.
English translation of International Preliminary Report on Patentability dated Dec. 20, 2012 issued in PCT/JP2011/060058.

* cited by examiner

*Primary Examiner* — Sophie Hon
(74) *Attorney, Agent, or Firm* — Scully, Scott, Murphy & Presser, P.C.

(57) ABSTRACT

Provided is an adhesive composition for polarizing plates, which is used for adhering polarizing plates, and which exhibits excellent durability even under high-temperature and high-moisture conditions, and which minimizes the occurrence of white streaks. Also provided are a polarizing plate with adhesive and liquid crystal display device using said adhesive composition. The adhesive composition for polarizing plates contains the following: (A) carboxyl group [CG]-containing (meth)acrylic copolymer [MACP] using 1.5 to 3 wt % CG-containing (meth)acrylic monomer [MAM] and 97 to 98.5% MAM not having a reactive functional group; (B) CG- and hydroxyl group [HG]-containing MACP using 0.5 to 3 wt % CG-containing MAM, 0.3 to 1 wt % HG-containing MAM, and 96 to 99.2 wt % MAM not having a reactive functional group; (C) toluene diisocyanate-type isocyanate compound; and (D) a silane coupling agent. The respective weight average molecular weight of (A) and (B) fall within the range of 950,000 to 1,050,000, the weight ratio of (A)/(B) falls within the range of 70/30 to 90/10, and (C) is contained in a ratio of 10 to 20 parts by weight with respect to 100 parts by weight of the total weight of MACP.

3 Claims, No Drawings

ADHESIVE COMPOSITION FOR POLARIZING PLATES, POLARIZING PLATE WITH ADHESIVE USING SAME, AND LIQUID CRYSTAL DISPLAY DEVICE USING SAME

TECHNICAL FIELD

The present invention relates to an adhesive composition for polarizing plates, a polarizing plate with adhesive using the adhesive composition, and a liquid crystal display device using the polarizing plate with adhesive. In particular, the present invention relates to an adhesive composition for polarizing plates includes at least a carboxyl group-containing (meth)acrylic copolymer and a carboxyl group and hydroxyl group-containing (meth)acrylic copolymer, a polarizing plate with adhesive using the adhesive composition, and a liquid crystal display device using the polarizing plate with adhesive.

BACKGROUND ART

Usually, a liquid crystal display device includes a liquid crystal cell configured such that a liquid crystal component oriented in a predetermined direction is sandwiched between two supporting substrates such as glass, and an optical film such as a polarizing plate, a phase difference film, a brightness improving film. An adhesive is used at the time of lamination of the optical films and adhesion of the optical film to the liquid crystal cell.

The liquid crystal display device is used as a display device of a personal computer, a television set, a car navigation system and the like in a wide range. The liquid crystal display device is used in various environments including such a severe environment as a high temperature and high humidity. Consequently, it is required for an adhesive to have such excellent durability that separation and air bubbles are not likely to occur even in a long-term use. In addition, in such a severe environment as a high temperature and high humidity, the polarizing plate is subjected to a change of dimension due to shrinkage or expansion, thereby stress is caused in the polarizing plate. In case that the stress associated with the change of dimension is not relaxed by the adhesive laminated on the polarizing plate and liquid crystal cell, the residual stress of the polarizing plate becomes inhomogeneous, thus, a liquid crystal display device using a conventional adhesive causes a problem referred to as so-called "white streaks" that are a phenomenon such that a light is leaked from the periphery of the display part so as to be whitened.

For improving the above-mentioned problem, an adhesive has been proposed, that has a stress relaxation property by that a low molecular weight polymer is added to the adhesive composition. For example, an adhesive composition for a polarizing plate that includes a high molecular weight acrylic copolymer, a low molecular weight acrylic copolymer having weight-average molecular weight of not more than 30,000 and a polyfunctional compound has been disclosed (refer to Patent Literature 1). The adhesive composition described in Patent Literature 1 follows the change of dimension of the polarizing plate, thus the occurrence of white streaks can be prevented. However, the adhesive composition described in Patent Literature 1 contains a large amount of the low molecular weight acrylic copolymer having weight-average molecular weight of not more than 30,000, thus in high temperature and high humidity, there is a possibility that air bubbles and separation occur in the adhesive composition.

In addition, an adhesive composition has been disclosed, that includes a mixture of a low glass-transition temperature (Tg) acrylic copolymer having a content of a functional group-containing monomer of not more than 0.5% by weight and a high Tg acrylic copolymer having a content of a functional group-containing monomer of not less than 6% by weight, a crosslinking agent reactive with the functional group and an isocyanate compound, and that has a gel fraction of less than 30% by weight (refer to Patent Literature 2). According to the description of Patent Literature 2, the adhesive composition described in Patent Literature 2 has a configuration that a crosslinking structure is formed in the molecules of the high Tg acrylic copolymer, and the molecules of the low Tg acrylic copolymers are connected to each other by a multimeric complex of the isocyanate compound, thereby the adhesive composition is capable of controlling the movement of the adhesive component in the adhesive layer. However, although the liquid crystal display device using the adhesive composition hardly cause the white streaks, the adhesive composition has an insufficient crosslinking density and low cohesion force under high-temperature condition, thus it is difficult to prevent occurrence of separation or air bubbles in an evaluation of durability.

Furthermore, recently, in accordance with the increase in size of the liquid crystal display device, the size to be required of the polarizing plate is becoming also larger. Dimensional change such as shrinkage or expansion of the polarizing plate becomes larger in proportion to the increase in size, thus durability and prevention of white streaks are required at higher level. As an adhesive composition that satisfies durability even if used for a liquid crystal display device increased in size, an adhesive composition of which cohesion force is heightened has been disclosed. For example, an adhesive composition for a polarizing plate has been disclosed, that includes a mixture of an acrylic copolymer (A) having a carboxyl-group or an amide group but not having a hydroxyl group and an acrylic copolymer (B) having a carboxyl-group or an amide group and having a hydroxyl group, the copolymer (A) and copolymer (B) being mixed in a weight ratio ((A)/(B)) of 20/80 to 50/50 and an isocyanate compound blended to the mixture (refer to Patent Literature 3). However, although the adhesive composition described in Patent Literature 3 is capable of preventing occurrence of separation and air bubbles under high-temperature and high-humidity conditions, it is deficient in an cohesion force necessary for preventing the white streaks at a good level in a liquid crystal display device increased in size, thus the liquid crystal display device increased in size using the adhesive composition cannot perfectly prevent the white streaks yet.

PRIOR ART DOCUMENTS

Patent Literature

Patent Literature 1: JP-A-1998 (Heisei-10)-279907
Patent Literature 2: JP-A-2006-133606
Patent Literature 3: JP-A-1997 (Heisei-09)-113724

SUMMARY OF THE INVENTION

Problems to be Solved by the Invention

Therefore, it is an object of the invention to provide an adhesive composition for polarizing plates that is used for the adhesion of polarizing plates, exhibits excellent durability even under high-temperature and high-humidity conditions and prevents the occurrence of the white streams, a polarizing plate with adhesive using the adhesive composition, and a liquid crystal display device using the polarizing plate with adhesive. In particular, an adhesive composition for polarizing plates that is preferably used for a liquid crystal display device increased in size having a display of not less than 19 inches wide, a polarizing plate with adhesive using the adhesive composition, and a liquid crystal display device using the polarizing plate with adhesive.

Means for Solving the Problems

In order to achieve the above-mentioned object, the present invention provides an adhesive composition for polarizing plates comprising:
a carboxyl group-containing (meth)acrylic copolymer (A);
a carboxyl group and hydroxyl group-containing (meth)acrylic copolymer (B);
a tolylene diisocyanate-based isocyanate compound (C); and
a silane coupling agent (D),
wherein, the respective weight average molecular weights of (A) and (B) fall within the range of 950,000 to 1,050,000,
the weight ratio of (A)/(B) falls within the ratio of 70/30 to 90/10,
(A) is a copolymer using 1.5 to 3 wt % of a carboxyl group-containing (meth)acrylic monomer and 97 to 98.5 wt % of a (meth)acrylic monomer not having a reactive functional group,
(B) is a copolymer using 0.5 to 3 wt % of a carboxyl group-containing (meth)acrylic monomer, 0.3 to 1 wt % of a hydroxyl group-containing (meth)acrylic monomer, and 96 to 99.2 wt % of a (meth)acrylic monomer not having a reactive functional group, and
(C) is contained in a ratio of 10 to 20 parts by weight with respect to 100 parts by weight of the total weight of the (meth)acrylic copolymers.

In addition, in order to achieve the above-mentioned object, the present invention provides a polarizing plate with adhesive having a configuration that the above-mentioned adhesive composition is laminated on a polarizing plate.

In addition, in order to achieve the above-mentioned object, the present invention provides a liquid crystal display device using the above-mentioned polarizing plate with adhesive.

Advantages of the Invention

In accordance with an adhesive composition for polarizing plates, a polarizing plate with adhesive using the adhesive composition, and a liquid crystal display device using the polarizing plate with adhesive according to the present invention, an adhesive composition for polarizing plates that is used for the adhesion of polarizing plates, exhibits excellent durability even under high-temperature and high-humidity conditions and prevents the occurrence of the white streams, a polarizing plate with adhesive using the adhesive composition, and a liquid crystal display device using the polarizing plate with adhesive can be provided. In particular, an adhesive composition for polarizing plates that is preferably used for a liquid crystal display device increased in size having a display of not less than 19 inches wide, a polarizing plate with adhesive using the adhesive composition, and a liquid crystal display device using the polarizing plate with adhesive can be provided.

EMBODIMENT FOR CARRYING OUT THE INVENTION

Hereinafter, the present invention will be explained in detail by an embodiment.

Embodiment

The embodiment of the present invention is an adhesive composition for polarizing plates that includes a carboxyl group-containing (meth)acrylic copolymer (A), a carboxyl group and hydroxyl group-containing (meth)acrylic copolymer (B), a tolylene diisocyanate-based isocyanate compound (C) and a silane coupling agent (D), wherein, the respective weight average molecular weights of (A) and (B) fall within the range of 950,000 to 1,050,000, the weight ratio of (A)/(B) falls within the ratio of 70/30 to 90/10, (A) is a copolymer using 1.5 to 3 wt % of a carboxyl group-containing (meth)acrylic monomer and 97 to 98.5 wt % of a (meth)acrylic monomer not having a reactive functional group, (B) is a copolymer using 0.5 to 3 wt % of a carboxyl group-containing (meth)acrylic monomer, 0.3 to 1 wt % of a hydroxyl group-containing (meth)acrylic monomer, and 96 to 99.2 wt % of a (meth)acrylic monomer not having a reactive functional group, and (C) is contained in a ratio of 10 to 20 parts by weight with respect to 100 parts by weight of the total weight of the (meth)acrylic copolymers.

The adhesive composition for polarizing plates of the invention is used for the adhesion of polarizing plates, exhibits excellent durability even under high-temperature and high-humidity conditions and prevents the occurrence of the white streams in a liquid crystal display device using the adhesive composition for polarizing plates of the present invention. In particular, it can be preferably used for a liquid crystal display device increased in size having a display of not less than 19 inches wide In the present invention, the carboxyl group-containing (meth)acrylic copolymer (A) is a copolymer that contains a (meth)acrylic monomer not having a reactive functional group as a main component, and uses the (meth)acrylic monomer not having a reactive functional group and a carboxyl group-containing (meth)acrylic monomer. The carboxyl group-containing (meth)acrylic copolymer (A) does not contain a hydroxyl group-containing (meth)acrylic monomer as the polymerization components.

The carboxyl group and hydroxyl group-containing (meth)acrylic copolymer (B) is a copolymer that contains a (meth)acrylic monomer not having a reactive functional group as a main component, and uses the (meth)acrylic monomer not having a reactive functional group, a carboxyl group-containing (meth)acrylic monomer and a hydroxyl group-containing (meth)acrylic monomer.

The type of the carboxyl group-containing (meth)acrylic monomer used for the carboxyl group-containing (meth)acrylic copolymer (A) and the carboxyl group and hydroxyl group-containing (meth)acrylic copolymer (B) may be equal to or different from each other in (A) and (B).

In the specification, "(meth)acrylic" is used as a meaning showing both of "acrylic" and "methacrylic", and "(meth)acrylate" is used as a meaning showing both of "acrylate" and "methacrylate"

The reactive functional group includes, for example, a carboxyl group and a hydroxyl group.

As the (meth)acrylic monomer not having a reactive functional group, a (meth)acrylic acid ester, in particular, a straight or branched alkyl ester having carbon number of 1 to 18 in the ester group can be used. In addition, one or not less than two of various types of derivatives thereof can be used. For example, methyl(meth)acrylate, ethyl (meth)acrylate, n-butyl(meth)acrylate, i-butyl(meth)acrylate, t-butyl(meth) acrylate, n-octyl (meth)acrylate, i-octyl(meth)acrylate, 2-ethylhexyl(meth)acrylate, n-nonyl(meth)acrylate, i-nonyl (meth)acrylate, n-decyl(meth)acrylate, n-dodecyl(meth)

acrylate, stearyl (meth)acrylate and the like can be used. Above all, n-butyl(meth)acrylate and t-butyl (meth)acrylate can be preferably used, since the cohesion force and adhesive force of the adhesive can be easily adjusted.

As the carboxyl group-containing (meth)acrylic monomer, for example, acrylic acid, methacrylic acid, ω-carboxy-polycaprolactone mono(meth)acrylate and the like can be used. Above all, acrylic acid can be preferably used, since it has a high reactivity with the other monomers at the time of copolymerization reaction so that unreacted monomers can be reduced.

As the hydroxyl group-containing (meth)acrylic monomer, for example, 2-hydroxyethyl(meth)acrylate, 2-hydroxypropyl(meth)acrylate, 3-hydroxypropyl (meth)acrylate, 4-hydroxybutyl(meth)acrylate, 3-methyl-3-hydroxybutyl (meth)acrylate, 1,3-dimethyl-3-hydroxybutyl(meth)acrylate, 2,2,4-trimethyl-3-hydroxypentyl(meth)acrylate, 2-ethyl-3-hydroxyhexyl(meth)acrylate, polypropyleneglycol mono(meth)acrylate, polyethyleneglycol mono(meth)acrylate, poly(ethyleneglycol-propyleneglycol) mono(meth)acrylate, and the like can be used. Above all, 2-hydroxyethyl(meth)acrylate, 2-hydroxypropyl(meth)acrylate, and 4-hydroxybutyl(meth)acrylate can be preferably used, since they have a high reactivity, and further the cross-linking reactivity is also high, if the obtained copolymer is used.

It is preferable that the respective weight average molecular weights of the carboxyl group-containing (meth)acrylic copolymer (A) and carboxyl group and hydroxyl group-containing (meth)acrylic copolymer (B) fall within the range of 950,000 to 1,050,000. If the respective weight average molecular weights are not less than 950,000, it is preferable, since the adhesive composition does not become fragile while having an appropriate hardness even under high-temperature and high-humidity conditions, has a proper degree of entanglement between molecules contained in the copolymer and exhibits an excellent durability. In addition, if the respective weight average molecular weights are not more than 1,050,000, it is preferable, since the adhesive composition can maintain viscosity suitable for coating the adhesive composition even if the solid content in the coating solution is heightened.

It is preferable that the weight ratio of the carboxyl group-containing (meth)acrylic copolymer (A) and the carboxyl group and hydroxyl group-containing (meth)acrylic copolymer (B) ((A)/(B)) falls within the ratio of 70/30 to 90/10. If (B) is not more than 30 in the weight ratio (A)/(B), it is preferable, since the adhesive composition can maintain a proper hardness and can prevent separation between the polarizing plate and the liquid crystal cell after lamination. If (B) is not less than 10 in the weight ratio (A)/(B), it is preferable, since air bubbles are not likely to occur in the adhesive layer even if the liquid crystal display device is used under high-temperature and high-humidity conditions.

It is preferable that the carboxyl group-containing (meth)acrylic copolymer (A) is a copolymer that uses 1.5 to 3 wt % of a carboxyl group-containing (meth)acrylic monomer and 97 to 98.5 wt % of a (meth)acrylic monomer not having a reactive functional group. If the carboxyl group-containing (meth)acrylic copolymer (A) is a copolymer that uses not less than 1.5 wt % of a carboxyl group-containing (meth)acrylic monomer, it is preferable, since the adhesive composition has a sufficient cohesion force and can prevent the separation between the polarizing plate and the liquid crystal cell even if the liquid crystal display device is used under high-temperature and high-humidity conditions. If the carboxyl group-containing (meth)acrylic copolymer (A) is a copolymer that uses not more than 3 wt % of a carboxyl group-containing (meth)acrylic monomer, it is preferable, since pot-life time can be sufficiently ensured at the time of coating the adhesive composition.

It is preferable that the carboxyl group and hydroxyl group-containing (meth)acrylic copolymer (B) is a copolymer that uses 0.5 to 3 wt % of a carboxyl group-containing (meth)acrylic monomer, 0.3 to 1 wt % of a hydroxyl group-containing (meth)acrylic monomer, and 96 to 99.2 wt % of a (meth)acrylic monomer not having a reactive functional group. If the carboxyl group and hydroxyl group-containing (meth)acrylic copolymer (B) is a copolymer that uses not less than 0.5 wt % of a carboxyl group-containing (meth)acrylic monomer, it is preferable, since air bubbles are not likely to occur in the adhesive layer even if the liquid crystal display device is used under high-temperature condition. If the carboxyl group and hydroxyl group-containing (meth)acrylic copolymer (B) is a copolymer that uses not more than 3.0 wt % of a carboxyl group-containing (meth)acrylic monomer, it is preferable, since the viscosity of the (meth)acrylic copolymer after cross-linking reaction can be controlled and the pot-life time can be sufficiently ensured at the time of coating the adhesive composition. The carboxyl group and hydroxyl group-containing (meth)acrylic copolymer (B) is a copolymer that uses not less than 0.3 wt % of a hydroxyl group-containing (meth)acrylic monomer, it is preferable, since air bubbles are not likely to occur in the adhesive layer even if the liquid crystal display device is used under high-temperature condition. The carboxyl group and hydroxyl group-containing (meth)acrylic copolymer (B) is a copolymer that uses not more than 1.0 wt % of a hydroxyl group-containing (meth)acrylic monomer, it is preferable, since the adhesive composition has a sufficient cohesion force and can prevent the separation between the polarizing plate and the liquid crystal cell even if the liquid crystal display device is used under high-temperature and high-humidity conditions.

It is preferable that the adhesive composition for polarizing plates of the present invention has a configuration that the tolylene diisocyanate-based isocyanate compound (C) is contained in a ratio of 10 to 20 parts by weight relative to 100 parts by weight of the total weight of the (meth)acrylic copolymers. If the adhesive composition for polarizing plates contains not less than 10 parts by weight of the tolylene diisocyanate-based isocyanate compound (C), the adhesive composition develops a cohesion force enough to prevent a contraction stress of the polarizing plate after the adhesive composition is applied thereto. Consequently, it is preferable, since "the white streaks" that are a phenomenon such that a light is leaked from the periphery of a liquid crystal display device in which polarizing plates with an adhesive composition are assembled with each other so as to be whitened can be prevented. If the adhesive composition for polarizing plates contains not more than 20 parts by weight of the tolylene diisocyanate-based isocyanate compound (C), it is preferable, since the adhesive composition has a sufficient cohesion force and can prevent the separation between the polarizing plate and the liquid crystal cell even if the liquid crystal display device is used under high-temperature and high-humidity conditions.

As the tolylene diisocyanate-based isocyanate compound (C), a tolylene diisocyanate compound derived from various types of isocyanates such as a dimer or a trimer of isocyanates, or an adduct of isocyanates and trimethylol propane polyol can be used.

As the tolylene diisocyanate-based isocyanate compound (C), for example, a commercially available product sold under the trade name of "Coronate L" ("Coronate" is a registered trade mark), manufactured by Nippon Polyurethane Industry Co., Ltd. can be preferably used.

It is preferable that the adhesive composition for polarizing plates of the present invention contains the silane coupling agent (D). If the adhesive composition for polarizing plates contains the silane coupling agent (D), it is preferable, since the separation between the adhesive layer and the polarizing plate or the liquid crystal cell is not likely to occur, even if the liquid crystal display device into which the polarizing plates are incorporated is used under high-temperature and high-humidity conditions. In particular, the adhesive composition for polarizing plates of the present invention is preferable, since it exhibits a sufficient adhesion force to flat and smooth glass.

The silane coupling agent (D) includes, for example, a polymerizable unsaturated group-containing silane compound such as vinyltrimethoxysilane, vinyltriethoxysilane, 3-methacryloxypropyltrimethoxysilane; a mercapto group-containing silane compound such as 3-mercaptopropyltrimethoxysilane, 3-mercaptopropyltriethoxysilane, 3-mercaptopropyldimethoxymethylsilane; an epoxy structure-containing silane compound such as 3-glycydoxypropyltrimethoxysilane, 2-(3,4-epoxycyclohexyl)ethyltrimethoxysilane; an amino group-containing silane compound such as 3-aminopropyltrimethoxysilane, N-(2-aminoethyl)-3-aminopropyltrimethoxysilane, N-(2-aminoethyl)-3-aminopropylmethyldimethoxysilane; tris(3-trimethoxysilylpropyl) isocyanurate; and the like. The above-mentioned compounds can be used individually or in combination of not less than two thereof.

As the silane coupling agent (D), for example, a commercially available product sold under the trade name of "KBM-403" manufactured by Shin-Etsu Chemical Co., Ltd. can be preferably used.

It is preferable that the adhesive composition for polarizing plates of the invention contains an epoxy-based cross-linking agent. If the adhesive composition for polarizing plates of the invention contains the epoxy-based cross-linking agent, it is preferable, since the cohesion force of the adhesive can be easily adjusted, and appearance abnormality can be prevented, even if the liquid crystal display device is used under high-temperature and high-humidity conditions.

As the epoxy-based cross-linking agent, for example, a commercially available product sold under the trade name of "TETRAD-X", and "TETRAD-C" manufactured by Mitsubishi Gas Chemical Company Inc. can be preferably used.

It is preferable that each of the glass-transition temperatures (Tg) of the carboxyl group-containing (meth)acrylic copolymer (A) and the carboxyl group and hydroxyl group-containing (meth)acrylic copolymer (B) is −60 to −40 degrees C. If each of the glass-transition temperatures (Tg) of the (meth)acrylic copolymers is not less than −60 degrees C., it is preferable, since the adhesive composition has a sufficient cohesion force and can prevent the separation between the polarizing plate and the liquid crystal cell even if the liquid crystal display device is used under high-temperature and high-humidity conditions. If each of the glass-transition temperatures (Tg) of the (meth)acrylic copolymers is not more than −40 degrees C., it is preferable, since the separation between the adhesive layer and the polarizing plate or the liquid crystal cell is not likely to occur.

The glass-transition temperature (Tg) of the (meth)acrylic copolymers is a value obtained by converting a temperature (degrees K) calculated by the Formula 1 described below to a temperature (degrees C.).

$$1/Tg = M1/Tg_1 + M2/Tg_2 + M3/Tg_3 + \ldots Mn/Tg_n \quad \text{[Formula 1]}$$

In the Formula 1, $Tg_1$, $Tg_2$, $Tg_3$ ... and $Tg_n$ represent the glass-transition temperature (K) of homopolymer of the component 1, component 2, component 3, ... and component n respectively. Also, in the Formula 1, M1, M2, M3, ... and Mn represent the molar fraction of the components respectively.

The polymerization method of the (meth)acrylic copolymers used for the present invention is not particularly limited, but the (meth)acrylic copolymers can be polymerized by a method such as solution polymerization, emulsion polymerization, and suspension polymerization. The solution polymerization is preferable, since the processing steps are relatively easy and carried out in a short time.

Generally, the solution polymerization is carried out such that predetermined organic solvents, monomers, polymerization initiators, and chain transfer agents if necessary are prepared in a polymerization tank, and a heating reaction is carried out in a stream of nitrogen gas or in a reflux of the organic solvent for several hours while stirring.

The initiator used in the present invention for the polymerization of the (meth)acrylic copolymers is not particularly limited, but for example, an azo-based compound can be used.

The weight-average molecular weight (Mw) of the (meth)acrylic copolymers used in the present invention is obtained as a desired molecular weight by adjusting reaction temperature, reaction time, the amount of solvent, and the type and amount of catalyst.

The weight-average molecular weight (Mw) of the (meth)acrylic copolymers is a value measured by the method described below.

(Measuring Method of Weight-Average Molecular Weight (Mw))

The weight-average molecular weight (Mw) is measured in accordance with the following steps (1) to (3).

(1) Coating a paper liner with a (meth)acrylic copolymer solution, and drying at 100 degrees C. for 2 minutes so as to obtain a (meth)acrylic copolymer having a film-like shape.

(2) Dissolving the (meth)acrylic copolymer having a film-like shape obtained in the above-mentioned step (1) with tetrahydrofuran so as to obtain solid content of 0.2%.

(3) Measuring the weight-average molecular weight (Mw) of the (meth)acrylic copolymer by using gel permeation chromatography (GPC) under the conditions described below.

(Conditions)
GPC: HLC-8220 GPC (manufactured by Tosoh Corporation)
Column: TSK-GEL GMHXL Use of Four columns
Mobile phase solvent: tetrahydrofuran
Standard sample: standard polystyrene
Flow speed: 0.6 ml/min
Column temperature: 40 degrees C.

It is possible to appropriately blend various types of additive agents and solvents in the adhesive composition for polarizing plates of the present invention.

One adherend of the adhesive composition of the present invention is a polarizing plate, in particular, triacetate cellulose (TAC). The amount of tolylene diisocyanate-based isocyanate compound is appropriate, thus the adhesive composition of the present invention is sufficiently adhered to the triacetate cellulose (TAC).

Another adherend of the adhesive composition of the present invention is a liquid crystal cell, in particular, alkali-free glass. The adhesive composition of the present invention contains the silane coupling agent, thus it is also sufficiently adhered to a flat and smooth glass used for the liquid crystal display device.

In addition, another embodiment of the present invention is relating to a polarizing plate with adhesive having a configuration that the above-mentioned adhesive composition is laminated on a polarizing plate. The polarizing plate with adhesive can be manufactured in such a way that the adhesive composition of the present invention is coated on a release sheet and then it is dried so as to form an adhesive layer on the release sheet, and then the adhesive layer is transferred to a polarizing plate so as to be cured.

As the release sheet, it is possible to use a plastic sheet such as a polyester sheet to which releasing treatment is applied by using a releasing agent such as fluorine-based resin, paraffin wax, silicone. The thickness of adhesive layer formed on the release sheet is, for example, 1 to 100 μm, preferably 5 to 50 μm, more preferably 15 to 30 μm, as a thickness after drying.

The adhesive composition coated on the release sheet is dried under the heating condition of approximately at 70 to 120 degrees C. for 1 to 3 minutes by a hot air drying machine.

The polarizing plate used in the present invention has a configuration that triacetate cellulose (TAC) is respectively laminated on the front surface and the rear surface of a film composed of a polarizer containing polyvinyl alcohol as a main component. Further, the polarizing plate used in the present invention has a thickness of approximately 190 μm.

The polarizing plate with adhesive of the present invention is applicable to a liquid crystal cell laminated thereon that has a size of not less than 19 inches wide (260 mm×415 mm). If the polarizing plate with adhesive has a size of not less than 19 inches wide (260 mm×415 mm), the expansion and contraction of the polarizing plate due to the influence of heat and humidity are enlarged. Consequently, the conventional polarizing plate with adhesive cannot prevent the stress under high-temperature and high-humidity conditions, so that the white streaks that occur in the periphery of vessel cannot be prevented at the time when a light source of the liquid crystal display device increased in size is lighted. On the other hand, the polarizing plate with adhesive of the present invention is configured such that the resin design of the copolymer and the type and amount of the cross-linking agent are appropriate, so as to prevent the stress under high-temperature and high-humidity conditions, thus it is also suitable for a liquid crystal cell that has a size of not less than 19 inches wide (260 mm×415 mm)

Hereinafter, Examples and Comparative Examples will be explained.

Manufacturing Method of Carboxyl Group-Containing (Meth)Acrylic Copolymer (A)

Manufacturing Example 1a 98.0 parts by weight of n-butylacrylate (BA), 2.0 part by weight of acrylic acid (AA), 90 parts by weight of ethyl acetate (EAc) and 0.3 part by weight of azobisdimethylvaleronitrile (ABVN) were introduced into a reactor vessel equipped with a thermometer, a stirrer, a nitrogen introduction tube and a reflux cooling tube, and then nitrogen gas was substituted for air in the reactor vessel. After that, the above-mentioned mixture was stirred, the temperature of the mixture in the reactor vessel was elevated to 65 degrees C. so as to be maintained for 8 hours, and a polymerization reaction was carried out. After completion of the polymerization reaction, the reaction mixture was diluted with ethyl acetate and adjusted the solid content to be 23.0%, so as to obtain a carboxyl group-containing (meth)acrylic copolymer solution. The weight-average molecular weight (Mw) of the (meth)acrylic copolymer by using gel permeation chromatography (GPC) was measured under the above-mentioned conditions.

Manufacturing Examples 2a to 7a

Carboxyl group-containing (meth)acrylic copolymer solutions were obtained in the same manner as the manufacturing example 1a except for changing the number of the parts by weight of a (meth)acrylic monomer used in the manufacturing example 1a to that of each manufacturing example described in Table 1 and appropriately adjusting the additive amount of the ABVN and EAc.

Manufacturing Method of Carboxyl Group and Hydroxyl Group-Containing (Meth)Acrylic Copolymer (B)

Manufacturing example 1b 84.5 parts by weight of n-butylacrylate (BA), 14.0 parts by weight of t-butylacrylate (tBA), 1.0 part by weight of acrylic acid (AA), 0.5 part by weight of 2-hydroxyethyl acrylate (2EHA), 90 parts by weight of ethyl acetate (EAc) and 0.3 part by weight of azobisdimethylvaleronitrile (ABVN) were introduced into a reactor vessel equipped with a thermometer, a stirrer, a nitrogen introduction tube and a reflux cooling tube, and then nitrogen gas was substituted for air in the reactor vessel. After that, the above-mentioned mixture was stirred, the temperature of the mixture in the reactor vessel was elevated to 65 degrees C. so as to be maintained for 8 hours, and a polymerization reaction was carried out. After completion of the polymerization reaction, the reaction mixture was diluted with ethyl acetate and adjusted the solid content to be 23.0%, so as to obtain a carboxyl group and hydroxyl group-containing (meth)acrylic copolymer solution. The weight-average molecular weight (Mw) of the (meth)acrylic copolymer by using gel permeation chromatography (GPC) was measured under the above-mentioned conditions.

Manufacturing Examples 2b to 14b

Carboxyl group and hydroxyl group-containing (meth) acrylic copolymer solutions were obtained in the same manner as the manufacturing example 1b except for changing the number of the parts by weight of a (meth)acrylic monomer used in the manufacturing example 1b to that of each manufacturing example described in Table 2 and appropriately adjusting the additive amount of the ABVN and EAc.

TABLE 1

|  |  |  | ME 1a | ME 2a | ME 3a | ME 4a | ME 5a | ME 6a | ME 7a |
|---|---|---|---|---|---|---|---|---|---|
| Acrylic copolymer (A) | Monomer composition | BA | 98.0 | 98.5 | 97.0 | 99.0 | 96.5 | 98.0 | 98.0 |
|  |  | AA | 2.0 | 1.5 | 3.0 | 1.0 | 3.5 | 2.0 | 2.0 |
|  | Molecular weight ($\times 10^4$) |  | 100 | 100 | 100 | 100 | 100 | 90 | 110 |
| Example |  |  |  | Ex1 Ex2 Ex5~12 | Ex3 | Ex4 | CoEx1 | CoEx2 | CoEx9 CoEx10 | CoEx11 CoEx16 |

TABLE 1-continued

|  | ME 1a | ME 2a | ME 3a | ME 4a | ME 5a | ME 6a | ME 7a |
|---|---|---|---|---|---|---|---|
|  | CoEx3~8 | | | | | | |
|  | CoEx12~15 | | | | | | |
|  | CoEx17~20 | | | | | | |

ME 1a to ME 7a: Manufacturing example 1a to Manufacturing example 7a
BA: n-butyl acrylate
AA: Acrylic acid
Ex1 to EX12: Example 1 to Example 12
CoEx1 to CoEx20: Comparative Example 1 to Comparative Example 20

TABLE 2

| | | | ME 1b | ME 2b | ME 3b | ME 4b | ME 5b | ME 6b | ME 7b | ME 8b | ME 9b | ME 10b | ME 11b | ME 12b | ME 13b | ME 14b |
|---|---|---|---|---|---|---|---|---|---|---|---|---|---|---|---|---|
| Acrylic copolymer (B) | Monomer composition | BA | 84.5 | 85.2 | 82.0 | 85.0 | 82.5 | 84.5 | 84.5 | 84.5 | 85.7 | 81.0 | 85.3 | 82.0 | 84.9 | 83.8 |
| | | tBA | 14.0 | 14.0 | 14.0 | 14.0 | 14.0 | 14.0 | 14.0 | 14.0 | 14.0 | 14.0 | 14.0 | 14.0 | 14.0 | 14.0 |
| | | AA | 1.0 | 0.5 | 3.0 | 0.5 | 3.0 | 1.0 | 1.0 | 1.0 | 0.2 | 3.5 | 0.2 | 3.5 | 1.0 | 1.0 |
| | | 2HEA | 0.5 | 0.3 | 1.0 | 0.5 | 0.5 | 0.5 | 0.5 | 0.5 | 0.1 | 1.5 | 0.5 | 0.5 | 0.1 | 1.2 |
| | Molecular weight ($\times 10^4$) | | 100 | 100 | 100 | 100 | 100 | 90 | 110 | 120 | 100 | 100 | 100 | 100 | 100 | 100 |
| Example | | | Ex1~8 CoEx1~9 | Ex9 | Ex10 | Ex11 | Ex12 | CoEx10 CoEx15 | CoEx 11 | CoEx 12 | CoEx 13 | CoEx 14 | CoEx 17 | CoEx 18 | CoEx 19 | CoEx 20 |

ME 1b to ME14b: Manufacturing example 1b to Manufacturing example 14b
BA: n-butyl acrylate
tBA: t-butyl acrylate
AA: Acrylic acid
2HEA: 2-hydroxyethylacrylate
Ex1 to EX12: Example 1 to Example 12
CoEx1 to CoEx20: Comparative Example 1 to Comparative Example 20

(Manufacturing of Adhesive Composition for Polarizing Plates)

Example 1

85 parts by weight converted to the solid content of the (meth)acrylic copolymer manufactured by the manufacturing example 1a as the carboxyl group-containing (meth)acrylic copolymer (A) and 15 parts by weight converted to the solid content of the (meth)acrylic copolymer manufactured by the manufacturing example 1b as the carboxyl group and hydroxyl group-containing (meth)acrylic copolymer (B) were mixed and stirred so as to obtain a mixture of a (meth) acrylic copolymer. To the mixture of the copolymer, 14.0 parts by weight converted to the solid content of Coronate L (manufactured by Nippon Polyurethane Industry Co., Ltd., active ingredient: 75%) as the tolylene diisocyanate-based isocyanate compound (C), and 0.1 parts by weight converted to the active ingredient of "KBM-403" (manufactured by Shin-Etsu Chemical Co., Ltd.) were added and stirred in the reaction vessel under the environment of 23 degrees C., so as to obtain the adhesive composition for polarizing plate.

Examples 2 to 12 and Comparative Examples 1 to 20

An adhesive composition for polarizing plates of each of Examples and Comparative Examples was obtained in the same manner as Example 1 except for changing the composition of (meth)acrylic monomer, the weight ratio of the copolymer, the cross-linking agent and the silane coupling agent used in Example 1 to that of each of Examples and Comparative Examples described in Tables 3 and 4.

The adhesive composition for polarizing plates manufactured by each of Examples and Comparative Examples was evaluated. The manufacturing method of samples and various evaluation methods are as follows.

(1) Manufacturing of Polarizing Plate with Adhesive

An adhesive composition was coated on a release sheet of which surface is treated by a silicone-based release agent. At this time, the coating amount of the adhesive composition was adjusted such that the adhesive composition had a thickness of 25 μm after the solvent was dried. The solid content of the adhesive composition was adjusted to 20.0 wt %. Next, the release sheet on which the adhesive composition was coated was dried for 90 seconds by using a hot air circulation type drying machine maintained at 100 degrees C., so as to form an adhesive layer. Subsequently, the adhesive layer was pressure-bonded to one surface of a polarizing plate by passing through nip rolls. After pressure-bonding, the polarizing plate was cured for 10 days under the environment of 23 degrees C. and 50% relative humidity (RH), so as to obtain a polarizing plate with adhesive.

(2) Evaluation of Durability

The polarizing plate with adhesive manufactured in the above-mentioned "(1) Manufacturing of polarizing plate with adhesive" was cut out to a piece having a rectangular shape of 260 mm×415 mm such that a polarizing axis of a light and the long side of the polarizing plate form an angle of 45 degrees. The piece obtained by cutting the polarizing plate with adhesive was laminated on one surface of an alkali free glass plate having a thickness of 0.7 mm (manufactured by Corning Incorporated, and sold under a trade name of "#1737") by using a lamination machine, so as to prepare test pieces for evaluation of durability. Next, the test pieces were subjected to autoclave treatment and then were maintained for 24 hours under the environment of 23 degrees C. and 50% relative humidity (RH). The autoclave treatment was carried out under the conditions of temperature: 50 degrees C., pressure: 5 kg/cm², and time: 20 minutes. Two test pieces were prepared. The test pieces was respectively maintained for 500 hours under the environment of (1) 80 degrees C. condition and (2) 60 degrees C. and 90% relative humidity (RH) one by one, after the durability test, visual confirmation was carried out with regard to existence or non-existence of the occurrence of air bubbles in the adhesive layer, and the occurrence of separation between the adhesive layer and the polarizing plate or the glass plate, so that durability was evaluated. The basis for evaluation is as follows.

a) Occurrence of Air Bubbles

○: occurrence of air bubbles is not observed at all, and applicable to a liquid crystal cell Δ: occurrence of air bubbles is slightly observed, but applicable to a liquid crystal cell x: occurrence of air bubbles is remarkably observed, and not applicable to a liquid crystal cell b) Occurrence of Separation ○: occurrence of separation is not observed, and applicable to a liquid crystal cell x: occurrence of separation is observed, and not applicable to a liquid crystal cell (3) Evaluation of White Streaks The polarizing plate with adhesive manufactured in the above-mentioned "(1) Manufacturing of polarizing plate with adhesive" was cut out to pieces having a rectangular shape of 260 mm×415 mm such that a polarizing axis of a light and the long side of the polarizing plate form angles of 45 and 135 degrees, so as to prepare each one of the pieces obtained by cutting the polarizing plate with adhesive. The pieces of the polarizing plate with adhesive cut were laminated on a front surface and a rear surface of an alkali free glass plate having a thickness of 0.7 mm (manufactured by Corning Incorporated, and sold under a trade name of "#1737") such that the polarizing axes are perpendicular to each other by using a lamination machine, so as to prepare test pieces for evaluation of white streaks. Next, the test pieces were subjected to autoclave treatment and then were maintained for 24 hours under the environment of 23 degrees C. and 50% relative humidity (RH). The autoclave treatment was carried out under the conditions of temperature: 50 degrees C., pressure: 5 kg/cm², and time: 20 minutes. After that, the test pieces was maintained for 500 hours under the environment of 80 degrees C. After being left, the test pieces were disposed on a uniform source (manufactured by I-System Co., LTD.), so as to visually confirm the white streaks by using an unevenness measurement system "EyeScale-3W" (manufactured by I-System Co., LTD.) under the environment of 23 degrees C. and 50% relative humidity (RH). The CCD camera of the unevenness measurement system "EyeScale-3W" was placed at the location of 20 cm from the test piece, so as to evaluate the white streaks.

c) Evaluation of White Streaks

◎: White streaks are not observed at all, and applicable to a liquid crystal cell ○: White streaks are observed, but applicable to a liquid crystal cell x: White streaks are observed and brightness of region of the white streaks is high, and not applicable to a liquid crystal cell (4) Coating Suitability of Adhesive Composition An adhesive composition was coated on a release sheet of which surface is treated by a silicone-based release agent. The solid content of the coating liquid of the adhesive composition was adjusted to 20% by using a solvent, and the adhesive composition was coated at the coating speed of 10 m/min by using an automatic coating machine (manufactured by Taiyu Kizai Co., LTD.), so as to evaluate existence or non-existence of unevenness and appearance abnormality.

d) Coating Suitability

○: unevenness and appearance abnormality are non-existent and coating is possible, and applicable to a liquid crystal cell x: unevenness or appearance abnormality is existent, thus not applicable to a liquid crystal cell (5) Pot Life of Adhesive Composition The adhesive composition used in the above-mentioned (4) "Coating suitability of adhesive composition" was maintained for 48 hours under the environment of 23 degrees C. and 50% relative humidity (RH), so as to be coated, and transparency and appearance of the adhesive composition and coating surface were visually evaluated.

e) Pot Life

○: transparency and appearance of the adhesive composition and coating surface are maintained, and applicable to a liquid crystal cell x: adhesive composition or coating surface produces a white turbidity, and not applicable to a liquid crystal cell Results evaluated by the above-mentioned evaluation methods are shown together with the composition of the adhesive in Table 3 and Table 4.

TABLE 3

| | | | | Ex1 | Ex2 | Ex3 | Ex4 | Ex5 | Ex6 | Ex7 | Ex8 | Ex9 | Ex10 | Ex11 | Ex12 |
|---|---|---|---|---|---|---|---|---|---|---|---|---|---|---|---|
| Composition of adhesive | Acrylic copolymer (A) | Monomer composition | BA | 98.0 | 98.0 | 98.5 | 97.0 | 98.0 | 98.0 | 98.0 | 98.0 | 98.0 | 98.0 | 98.0 | 98.0 |
| | | | AA | 2.0 | 2.0 | 1.5 | 3.0 | 2.0 | 2.0 | 2.0 | 2.0 | 2.0 | 2.0 | 2.0 | 2.0 |
| | | Molecular weight (×10⁴) | | 100 | 100 | 100 | 100 | 100 | 100 | 100 | 100 | 100 | 100 | 100 | 100 |
| | Acrylic copolymer (B) | Monomer composition | BA | 84.5 | 84.5 | 84.5 | 84.5 | 84.5 | 84.5 | 84.5 | 84.5 | 85.2 | 82.0 | 85.0 | 82.5 |
| | | | tBA | 14.0 | 14.0 | 14.0 | 14.0 | 14.0 | 14.0 | 14.0 | 14.0 | 14.0 | 14.0 | 14.0 | 14.0 |
| | | | AA | 1.0 | 1.0 | 1.0 | 1.0 | 1.0 | 1.0 | 1.0 | 1.0 | 0.5 | 3.0 | 0.5 | 3.0 |
| | | | 2HEA | 0.5 | 0.5 | 0.5 | 0.5 | 0.5 | 0.5 | 0.5 | 0.5 | 0.3 | 1.0 | 0.5 | 0.5 |
| | | Molecular weight (×10⁴) | | 100 | 100 | 100 | 100 | 100 | 100 | 100 | 100 | 100 | 100 | 100 | 100 |
| | Copolymer weight ratio | (A)/(B) | | 85/15 | 85/15 | 85/15 | 85/15 | 70/30 | 90/10 | 85/15 | 85/15 | 85/15 | 85/15 | 85/15 | 85/15 |
| | Cross-linking agent | | Coronate L | 14.0 | 14.0 | 14.0 | 14.0 | 14.0 | 14.0 | 11.0 | 18.0 | 14.0 | 14.0 | 14.0 | 14.0 |
| | | | TETRAD-X | — | 0.02 | — | — | — | — | — | — | — | — | — | — |
| | Silane coupling agent | | KBM-403 | 0.1 | 0.1 | 0.1 | 0.1 | 0.1 | 0.1 | 0.1 | 0.1 | 0.1 | 0.1 | 0.1 | 0.1 |
| Evaluation result | Durability | 80 degrees C. | a) Air bubbles | ○ | ○ | ○ | ○ | ○ | ○ | ○ | ○ | ○ | ○ | ○ | ○ |
| | | | b) Separation | ○ | ○ | ○ | ○ | ○ | ○ | ○ | ○ | ○ | ○ | ○ | ○ |
| | | 60 degrees C. 90% RH | a) Air bubbles | ○ | ○ | ○ | ○ | ○ | ○ | ○ | ○ | ○ | ○ | ○ | ○ |
| | | | b) Separation | ○ | ○ | ○ | ○ | ○ | ○ | ○ | ○ | ○ | ○ | ○ | ○ |
| | c) White streaks | | | ◎ | ◎ | ◎ | ◎ | ◎ | ◎ | ○ | ◎ | ◎ | ◎ | ◎ | ◎ |

TABLE 3-continued

|  | | | Ex1 | Ex2 | Ex3 | Ex4 | Ex5 | Ex6 | Ex7 | Ex8 | Ex9 | Ex10 | Ex11 | Ex12 |
|---|---|---|---|---|---|---|---|---|---|---|---|---|---|---|
| | d) Coating suitability | | ○ | ○ | ○ | ○ | ○ | ○ | ○ | ○ | ○ | ○ | ○ | ○ |
| | e) Pot life | | ○ | ○ | ○ | ○ | ○ | ○ | ○ | ○ | ○ | ○ | ○ | ○ |

Ex1 to EX12: Example 1 to Example 12
BA: n-butyl acrylate
tBA: t-butyl acrylate
AA: Acrylic acid
2HEA: 2-hydroxyethylacrylate

TABLE 4

| | | | | CoEx 1 | CoEx 2 | CoEx 3 | CoEx 4 | CoEx 5 | CoEx 6 | CoEx 7 | CoEx 8 | CoEx 9 | CoEx 10 |
|---|---|---|---|---|---|---|---|---|---|---|---|---|---|
| Composition of adhesive | Acrylic copolymer (A) | Monomer composition | BA | 99.0 | 96.5 | 98.0 | 98.0 | 98.0 | 98.0 | 98.0 | 98.0 | 98.0 | 98.0 |
| | | | AA | 1.0 | 3.5 | 2.0 | 2.0 | 2.0 | 2.0 | 2.0 | 2.0 | 2.0 | 2.0 |
| | | Molecular weight (×10⁴) | | 100 | 100 | 100 | 100 | 100 | 100 | 100 | 100 | 90 | 90 |
| | Acrylic copolymer (B) | Monomer composition | BA | 84.5 | 84.5 | 84.5 | 84.5 | 84.5 | 84.5 | 84.5 | 84.5 | 84.5 | 84.5 |
| | | | tBA | 14.0 | 14.0 | 14.0 | 14.0 | 14.0 | 14.0 | 14.0 | 14.0 | 14.0 | 14.0 |
| | | | AA | 1.0 | 1.0 | 1.0 | 1.0 | 1.0 | 1.0 | 1.0 | 1.0 | 1.0 | 1.0 |
| | | | 2HEA | 0.5 | 0.5 | 0.5 | 0.5 | 0.5 | 0.5 | 0.5 | 0.5 | 0.5 | 0.5 |
| | | Molecular weight (×10⁴) | | 100 | 100 | 100 | 100 | 100 | 100 | 100 | 100 | 100 | 90 |
| | Copolymer weight ratio | | (A)/(B) | 85/15 | 85/15 | 65/35 | 95/5 | 85/15 | 85/15 | 85/15 | 85/15 | 85/15 | 85/15 |
| | Cross-linking agent | | Coronate L | 14.0 | 14.0 | 14.0 | 14.0 | 3.0 | 8.0 | 25.0 | 14.0 | 14.0 | 14.0 |
| | | | TETRAD-X | — | — | — | — | — | — | — | — | — | — |
| | Silane coupling agent | | KBM-403 | 0.1 | 0.1 | 0.1 | 0.1 | 0.1 | 0.1 | 0.1 | — | 0.1 | 0.1 |
| Evaluation result | Durability | 80 degrees C. | a) Air bubbles | ○ | ○ | ○ | X | ○ | ○ | ○ | Δ | ○ | ○ |
| | | | b) Separation | ○ | ○ | ○ | ○ | ○ | ○ | ○ | ○ | ○ | ○ |
| | | 60 degrees C. 90% RH | a) Air bubbles | ○ | ○ | ○ | ○ | ○ | ○ | ○ | ○ | ○ | ○ |
| | | | b) Separation | X | ○ | X | ○ | ○ | ○ | X | X | X | X |
| | C) White streaks | | | ◎ | ◎ | ◎ | ○ | X | X | ◎ | ◎ | ○ | ○ |
| | d) Coating suitability | | | ○ | ○ | ○ | ○ | ○ | ○ | ○ | ○ | ○ | ○ |
| | e) Pot life | | | ○ | X | ○ | ○ | ○ | ○ | X | ○ | ○ | ○ |

| | | | | CoEx 11 | CoEx 12 | CoEx 13 | CoEx 14 | CoEx 15 | CoEx 16 | CoEx 17 | CoEx 18 | CoEx 19 | CoEx 20 |
|---|---|---|---|---|---|---|---|---|---|---|---|---|---|
| Composition of adhesive | Acrylic copolymer (A) | Monomer composition | BA | 98.0 | 98.0 | 98.0 | 98.0 | 98.0 | 98.0 | 98.0 | 98.0 | 98.0 | 98.0 |
| | | | AA | 2.0 | 2.0 | 2.0 | 2.0 | 2.0 | 2.0 | 2.0 | 2.0 | 2.0 | 2.0 |
| | | Molecular weight (×10⁴) | | 110 | 100 | 100 | 100 | 100 | 100 | 100 | 100 | 100 | 100 |
| | Acrylic copolymer (B) | Monomer composition | BA | 84.5 | 84.5 | 85.7 | 81.0 | 84.5 | 84.5 | 85.3 | 82.0 | 84.9 | 83.8 |
| | | | tBA | 14.0 | 14.0 | 14.0 | 14.0 | 14.0 | 14.0 | 14.0 | 14.0 | 14.0 | 14.0 |
| | | | AA | 1.0 | 1.0 | 0.2 | 3.5 | 1.0 | 1.0 | 0.2 | 3.5 | 1.0 | 1.0 |
| | | | 2HEA | 0.5 | 0.5 | 0.1 | 1.5 | 0.5 | 0.5 | 0.5 | 0.5 | 0.1 | 1.2 |
| | | Molecular weight (×10⁴) | | 110 | 120 | 100 | 100 | 90 | 100 | 100 | 100 | 100 | 100 |
| | Copolymer weight ratio | | (A)/(B) | 85/15 | 70/30 | 85/15 | 85/15 | 85/15 | 85/15 | 85/15 | 85/15 | 85/15 | 85/15 |
| | Cross-linking agent | | Coronate L | 14.0 | 14.0 | 14.0 | 14.0 | 14.0 | 14.0 | 14.0 | 14.0 | 14.0 | 14.0 |
| | | | TETRAD-X | — | — | — | — | — | — | — | — | — | — |
| | Silane coupling agent | | KBM-403 | 0.1 | 0.1 | 0.1 | 0.1 | 0.1 | 0.1 | 0.1 | 0.1 | 0.1 | 0.1 |
| Evaluation result | Durability | 80 degrees C. | a) Air bubbles | ○ | ○ | X | ○ | ○ | ○ | ○ | ○ | X | ○ |
| | | | b) Separation | ○ | ○ | ○ | ○ | ○ | ○ | ○ | ○ | ○ | ○ |
| | | 60 degrees C. 90% RH | a) Air bubbles | ○ | ○ | ○ | ○ | ○ | ○ | ○ | ○ | ○ | ○ |
| | | | b) Separation | ○ | ○ | X | X | X | ○ | X | X | ○ | X |
| | C) White streaks | | | ◎ | ◎ | X | ◎ | ○ | ◎ | ◎ | ◎ | X | ◎ |
| | d) Coating suitability | | | X | X | ○ | ○ | ○ | X | ○ | ○ | ○ | ○ |
| | e) Pot life | | | ○ | ○ | ○ | X | ○ | ○ | ○ | ○ | ○ | ○ |

CoEx1 to CoEx20: Comparative Example 1 to Comparative Example 20
BA: n-butyl acrylate
tBA: t-butyl acrylate
AA: Acrylic acid
2HEA: 2-hydroxyethylacrylate In accordance with Table 3, the adhesive composition of the invention exhibits excellent performance, even if it is applied to a polarizing plate with adhesive increased in size. For example, the adhesive composition of Example 1 has a cohesion force that falls within the appropriate range, thus air bubbles do not occur in an adhesive layer under high-temperature condition and separation of the adhesive layer does not occur under high-temperature and high-humidity conditions. In addition, it is manufactured by a cross-linking reaction that is controlled, thereby the copolymer has a cross-linking density that falls within the appropriate range, thus the adhesive composition of Example 1 does not cause the white streaks. In addition, it includes a silane coupling agent, thus the adhesive composition of Example 1 exhibits a sufficient adhesive force to a flat and smooth glass surface and does not cause the appearance abnormality in the durability test. In addition, it has a molecular weight that falls within the appropriate range, thus a coating liquid using the adhesive composition of Example 1 is excellent in coating suitability even if the solid content is high. Furthermore, it is manufactured by a cross-linking reaction that is controlled, thereby the coating liquid using the adhesive composition of Example 1 maintains a sufficient pot life.

In accordance with Table 4, for example, the adhesive composition of Comparative Example 3 has a too high cohesion force, thus an adhesive layer is hardened, so as to occur the separation thereof in durability test, if it is applied to a polarizing plate with adhesive increased in size.

In accordance with Table 4, for example, the copolymer has a cross-linking density that does not fall within the appropriate range, thus the adhesive composition of Comparative Example 2 does not appropriately maintain the pot life.

In accordance with Table 4, for example, the adhesive composition of Comparative Example 4 has a deficient cohesion force, thus the air bubbles occur in durability test, if it is applied to a polarizing plate with adhesive increased in size.

In accordance with Table 4, for example, the copolymer has a cross-linking density that does not fall within the appropriate range, thus the adhesive composition of Comparative Example 5 causes the white streaks, if it is applied to a polarizing plate with adhesive increased in size.

In accordance with Table 4, for example, the adhesive composition of Comparative Example 11 causes the appearance abnormality at the time of coating, when the solid content of the coating liquid is heightened.

TABLE 1

|  |  |  | ME 1a | ME 2a | ME 3a | ME 4a | ME 5a | ME 6a | ME 7a |
|---|---|---|---|---|---|---|---|---|---|
| Acrylic copolymer (A) | Monomer composition | BA | 98.0 | 98.5 | 97.0 | 99.0 | 96.5 | 98.0 | 98.0 |
|  |  | AA | 2.0 | 1.5 | 3.0 | 1.0 | 3.5 | 2.0 | 2.0 |
|  | Molecular weight ($\times 10^4$) |  | 100 | 100 | 100 | 100 | 100 | 90 | 110 |
|  | Example |  | Ex1 Ex2 Ex5~12 CoEx3~8 CoEx12~15 CoEx17~20 | Ex3 | Ex4 | CoEx1 | CoEx2 | CoEx9 CoEx10 | CoEx11 CoEx16 |

ME 1a to ME 7a: Manufacturing example 1a to Manufacturing example 7a
BA: n-butyl acrylate
AA: Acrylic acid
Ex1 to Ex12: Example 1 to Example 12
CoEx1 to CoEx20: Comparative Example 1 to Comparative Example 20

TABLE 2

|  |  |  | ME 1b | ME 2b | ME 3b | ME 4b | ME 5b | ME 6b | ME 7b | ME 8b | ME 9b | ME 10b | ME 11b | ME 12b | ME 13b | ME 14b |
|---|---|---|---|---|---|---|---|---|---|---|---|---|---|---|---|---|
| Acrylic copolymer (B) | Monomer composition | BA | 84.5 | 85.2 | 82.0 | 85.0 | 82.5 | 84.5 | 84.5 | 84.5 | 85.7 | 81.0 | 85.3 | 82.0 | 84.9 | 83.8 |
|  |  | tBA | 14.0 | 14.0 | 14.0 | 14.0 | 14.0 | 14.0 | 14.0 | 14.0 | 14.0 | 14.0 | 14.0 | 14.0 | 14.0 | 14.0 |
|  |  | AA | 1.0 | 0.5 | 3.0 | 0.5 | 3.0 | 1.0 | 1.0 | 1.0 | 0.2 | 3.5 | 0.2 | 3.5 | 1.0 | 1.0 |
|  |  | 2HEA | 0.5 | 0.3 | 1.0 | 0.5 | 0.5 | 0.5 | 0.5 | 0.5 | 0.1 | 1.5 | 0.5 | 0.5 | 0.1 | 1.2 |
|  | Molecular weight ($\times 10^4$) |  | 100 | 100 | 100 | 100 | 100 | 90 | 110 | 120 | 100 | 100 | 100 | 100 | 100 | 100 |
|  | Example |  | Ex1~8 CoEx1~9 | Ex9 | Ex10 | Ex11 | Ex12 | CoEx10 CoEx15 | CoEx 11 | CoEx 12 | CoEx 13 | CoEx 14 | CoEx 17 | CoEx 18 | CoEx 19 | CoEx 20 |

ME 1b to ME14b: Manufacturing example 1b to Manufacturing example 14b
BA: n-butyl acrylate
tBA: t-butyl acrylate
AA: Acrylic acid
2HEA: 2-hydroxyethylacrylate
Ex1 to Ex12: Example 1 to Example 12
CoEx1 to CoEx20: Comparative Example 1 to Comparative Example 20

TABLE 3

|  |  |  |  | Ex1 | Ex2 | Ex3 | Ex4 | Ex5 | Ex6 | Ex7 | Ex8 | Ex9 | Ex10 | Ex11 | Ex12 |
|---|---|---|---|---|---|---|---|---|---|---|---|---|---|---|---|
| Composition of adhesive | Acrylic copolymer (A) | Monomer composition | BA | 98.0 | 98.0 | 98.5 | 97.0 | 98.0 | 98.0 | 98.0 | 98.0 | 98.0 | 98.0 | 98.0 | 98.0 |
|  |  |  | AA | 2.0 | 2.0 | 1.5 | 3.0 | 2.0 | 2.0 | 2.0 | 2.0 | 2.0 | 2.0 | 2.0 | 2.0 |
|  |  | Molecular weight ($\times 10^4$) |  | 100 | 100 | 100 | 100 | 100 | 100 | 100 | 100 | 100 | 100 | 100 | 100 |
|  | Acrylic copolymer (B) | Monomer composition | BA | 84.5 | 84.5 | 84.5 | 84.5 | 84.5 | 84.5 | 84.5 | 84.5 | 85.2 | 82.0 | 85.0 | 82.5 |
|  |  |  | tBA | 14.0 | 14.0 | 14.0 | 14.0 | 14.0 | 14.0 | 14.0 | 14.0 | 14.0 | 14.0 | 14.0 | 14.0 |
|  |  |  | AA | 1.0 | 1.0 | 1.0 | 1.0 | 1.0 | 1.0 | 1.0 | 1.0 | 0.5 | 3.0 | 0.5 | 3.0 |
|  |  |  | 2HEA | 0.5 | 0.5 | 0.5 | 0.5 | 0.5 | 0.5 | 0.5 | 0.5 | 0.3 | 1.0 | 0.5 | 0.5 |
|  |  | Molecular weight ($\times 10^4$) |  | 100 | 100 | 100 | 100 | 100 | 100 | 100 | 100 | 100 | 100 | 100 | 100 |
|  | Copolymer weight ratio | (A)/(B) |  | 85/15 | 85/15 | 85/15 | 85/15 | 70/30 | 90/10 | 85/15 | 85/15 | 85/15 | 85/15 | 85/15 | 85/15 |
|  | Cross-linking agent | Coronate L |  | 14.0 | 14.0 | 14.0 | 14.0 | 14.0 | 14.0 | 11.0 | 18.0 | 14.0 | 14.0 | 14.0 | 14.0 |
|  |  | TETRAD-X |  | — | 0.02 | — | — | — | — | — | — | — | — | — | — |
|  | Silane coupling agent | KBM-403 |  | 0.1 | 0.1 | 0.1 | 0.1 | 0.1 | 0.1 | 0.1 | 0.1 | 0.1 | 0.1 | 0.1 | 0.1 |
| Evaluation result | Durability | 80 degrees C. | a) Air bubbles | ○ | ○ | ○ | ○ | ○ | ○ | ○ | ○ | ○ | ○ | ○ | ○ |
|  |  |  | b) Separation | ○ | ○ | ○ | ○ | ○ | ○ | ○ | ○ | ○ | ○ | ○ | ○ |
|  |  | 60 degrees C. 90% RH | a) Air bubbles | ○ | ○ | ○ | ○ | ○ | ○ | ○ | ○ | ○ | ○ | ○ | ○ |
|  |  |  | b) Separation | ○ | ○ | ○ | ○ | ○ | ○ | ○ | ○ | ○ | ○ | ○ | ○ |
|  | c) White streaks |  |  | ◎ | ◎ | ◎ | ◎ | ◎ | ◎ | ◎ | ○ | ◎ | ◎ | ◎ | ◎ |

TABLE 3-continued

|  |  | Ex1 | Ex2 | Ex3 | Ex4 | Ex5 | Ex6 | Ex7 | Ex8 | Ex9 | Ex10 | Ex11 | Ex12 |
|---|---|---|---|---|---|---|---|---|---|---|---|---|---|
|  | d) Coating suitability | ○ | ○ | ○ | ○ | ○ | ○ | ○ | ○ | ○ | ○ | ○ | ○ |
|  | e) Pot life | ○ | ○ | ○ | ○ | ○ | ○ | ○ | ○ | ○ | ○ | ○ | ○ |

Ex1 to Ex12: Example 1 to Example 12
BA: n-butyl acrylate
tBA: t-butyl acrylate
AA: Acrylic acid
2HEA: 2-hydroxyethylacrylate

TABLE 4

|  |  |  |  | CoEx 1 | CoEx 2 | CoEx 3 | CoEx 4 | CoEx 5 | CoEx 6 | CoEx 7 | CoEx 8 | CoEx 9 | CoEx 10 |
|---|---|---|---|---|---|---|---|---|---|---|---|---|---|
| Composition of adhesive | Acrylic copolymer (A) | Monomer composition | BA | 99.0 | 96.5 | 98.0 | 98.0 | 98.0 | 98.0 | 98.0 | 98.0 | 98.0 | 98.0 |
|  |  |  | AA | 1.0 | 3.5 | 2.0 | 2.0 | 2.0 | 2.0 | 2.0 | 2.0 | 2.0 | 2.0 |
|  |  | Molecular weight (×10⁴) |  | 100 | 100 | 100 | 100 | 100 | 100 | 100 | 100 | 90 | 90 |
|  | Acrylic copolymer (B) | Monomer composition | BA | 84.5 | 84.5 | 84.5 | 84.5 | 84.5 | 84.5 | 84.5 | 84.5 | 84.5 | 84.5 |
|  |  |  | tBA | 14.0 | 14.0 | 14.0 | 14.0 | 14.0 | 14.0 | 14.0 | 14.0 | 14.0 | 14.0 |
|  |  |  | AA | 1.0 | 1.0 | 1.0 | 1.0 | 1.0 | 1.0 | 1.0 | 1.0 | 1.0 | 1.0 |
|  |  |  | 2HEA | 0.5 | 0.5 | 0.5 | 0.5 | 0.5 | 0.5 | 0.5 | 0.5 | 0.5 | 0.5 |
|  |  | Molecular weight (×10⁴) |  | 100 | 100 | 100 | 100 | 100 | 100 | 100 | 100 | 100 | 90 |
|  | Copolymer weight ratio | (A)/(B) |  | 85/15 | 85/15 | 65/35 | 95/5 | 85/15 | 85/15 | 85/15 | 85/15 | 85/15 | 85/15 |
|  | Cross-linking agent | Coronate L |  | 14.0 | 14.0 | 14.0 | 14.0 | 3.0 | 8.0 | 25.0 | 14.0 | 14.0 | 14.0 |
|  |  | TETRAD-X |  | — | — | — | — | — | — | — | — | — | — |
|  | Silane coupling agent | KBM-403 |  | 0.1 | 0.1 | 0.1 | 0.1 | 0.1 | 0.1 | 0.1 | — | 0.1 | 0.1 |
| Evaluation result | Durability | 80 degrees C. | a) Air bubbles | ○ | ○ | ○ | X | ○ | ○ | ○ | Δ | ○ | ○ |
|  |  |  | b) Separation | ○ | ○ | ○ | ○ | ○ | ○ | ○ | ○ | ○ | ○ |
|  |  | 60 degrees C. | a) Air bubbles | ○ | ○ | ○ | ○ | ○ | ○ | ○ | ○ | ○ | ○ |
|  |  | 90% RH | b) Separation | X | ○ | X | ○ | ○ | ○ | X | X | X | X |
|  | C) White streaks |  |  | ◉ | ◉ | ◉ | ○ | X | X | ◉ | ◉ | ○ | ○ |
|  | d) Coating suitability |  |  | ○ | X | ○ | ○ | ○ | ○ | X | ○ | ○ | ○ |
|  | e) Pot life |  |  | ○ | ○ | ○ | ○ | ○ | ○ | ○ | ○ | ○ | ○ |

|  |  |  |  | CoEx 11 | CoEx 12 | CoEx 13 | CoEx 14 | CoEx 15 | CoEx 16 | CoEx 17 | CoEx 18 | CoEx 19 | CoEx 20 |
|---|---|---|---|---|---|---|---|---|---|---|---|---|---|
| Composition of adhesive | Acrylic copolymer (A) | Monomer composition | BA | 98.0 | 98.0 | 98.0 | 98.0 | 98.0 | 98.0 | 98.0 | 98.0 | 98.0 | 98.0 |
|  |  |  | AA | 2.0 | 2.0 | 2.0 | 2.0 | 2.0 | 2.0 | 2.0 | 2.0 | 2.0 | 2.0 |
|  |  | Molecular weight (×10⁴) |  | 110 | 100 | 100 | 100 | 100 | 100 | 100 | 100 | 100 | 100 |
|  | Acrylic copolymer (B) | Monomer composition | BA | 84.5 | 84.5 | 85.7 | 81.0 | 84.5 | 84.5 | 85.3 | 82.0 | 84.9 | 83.8 |
|  |  |  | tBA | 14.0 | 14.0 | 14.0 | 14.0 | 14.0 | 14.0 | 14.0 | 14.0 | 14.0 | 14.0 |
|  |  |  | AA | 1.0 | 1.0 | 0.2 | 3.5 | 1.0 | 1.0 | 0.2 | 3.5 | 1.0 | 1.0 |
|  |  |  | 2HEA | 0.5 | 0.5 | 0.1 | 1.5 | 0.5 | 0.5 | 0.5 | 0.5 | 0.1 | 1.2 |
|  |  | Molecular weight (×10⁴) |  | 110 | 120 | 100 | 100 | 90 | 100 | 100 | 100 | 100 | 100 |
|  | Copolymer weight ratio | (A)/(B) |  | 85/15 | 70/30 | 85/15 | 85/15 | 85/15 | 85/15 | 85/15 | 85/15 | 85/15 | 85/15 |
|  | Cross-linking agent | Coronate L |  | 14.0 | 14.0 | 14.0 | 14.0 | 14.0 | 14.0 | 14.0 | 14.0 | 14.0 | 14.0 |
|  |  | TETRAD-X |  | — | — | — | — | — | — | — | — | — | — |
|  | Silane coupling agent | KBM-403 |  | 0.1 | 0.1 | 0.1 | 0.1 | 0.1 | 0.1 | 0.1 | 0.1 | 0.1 | 0.1 |
| Evaluation result | Durability | 80 degrees C. | a) Air bubbles | ○ | ○ | X | ○ | ○ | ○ | ○ | ○ | X | ○ |
|  |  |  | b) Separation | ○ | ○ | ○ | ○ | ○ | ○ | ○ | ○ | ○ | ○ |
|  |  | 60 degrees C. | a) Air bubbles | ○ | ○ | ○ | ○ | ○ | ○ | ○ | ○ | ○ | ○ |
|  |  | 90% RH | b) Separation | ○ | ○ | X | X | X | ○ | X | X | ○ | X |
|  | C) White streaks |  |  | ◉ | ◉ | X | ◉ | ○ | ◉ | ◉ | ◉ | X | ◉ |
|  | d) Coating suitability |  |  | X | X | ○ | ○ | ○ | X | ○ | ○ | ○ | ○ |
|  | e) Pot life |  |  | ○ | ○ | ○ | X | ○ | ○ | ○ | ○ | ○ | ○ |

CoEx1 to CoEx20: Comparative Example 1 to Comparative Example 20
BA: n-butyl acrylate
tBA: t-butyl acrylate
AA: Acrylic acid
2HEA: 2-hydroxyethylacrylate

What is claimed is:

1. An adhesive composition for polarizing plates comprising:
   a carboxyl group-containing (meth)acrylic copolymer (A);
   a carboxyl group and hydroxyl group-containing (meth)acrylic copolymer (B);
   a tolylene diisocyanate-based isocyanate compound (C); and
   a silane coupling agent (D),
   wherein, the respective weight average molecular weights of (A) and (B) fall within the range of 950,000 to 1,050,000,
   the respective glass-transition temperatures (Tg) of (A) and (B) fall within the range of −60 to −40 degrees C.,
   the weight ratio of (A)/(B) falls within the ratio of 70/30 to 90/10,
   (A) is a copolymer using 1.5 to 3 wt % of a carboxyl group-containing (meth)acrylic monomer and 97 to 98.5 wt % of a (meth)acrylic monomer not having a reactive functional group,
(B) is a copolymer using 0.5 to 3 wt % of a carboxyl group-containing (meth)acrylic monomer, 0.3 to 1 wt % of a hydroxyl group-containing (meth)acrylic monomer, and 96 to 99.2 wt % of a (meth)acrylic monomer not having a reactive functional group, and
(C) is contained in a ratio of 10 to 20 parts by weight relative to 100 parts by weight of the total weight of the (meth)acrylic copolymers.

2. A polarizing plate with adhesive having a configuration in which the adhesive composition according to claim 1 is laminated on a surface of the polarizing plate.

3. A liquid crystal display device comprising the polarizing plate with adhesive according to claim 2.

* * * * *